(12) United States Patent
Cheng et al.

(10) Patent No.: US 8,983,930 B2
(45) Date of Patent: Mar. 17, 2015

(54) FACET GROUP RANKING FOR SEARCH RESULTS

(71) Applicant: Wal-Mart Stores, Inc., Bentonville, AR (US)

(72) Inventors: Jinxing Cheng, Palo Alto, CA (US); Abhishek Gattani, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 178 days.

(21) Appl. No.: 13/794,475

(22) Filed: Mar. 11, 2013

(65) Prior Publication Data

US 2014/0258277 A1 Sep. 11, 2014

(51) Int. Cl.
*G06F 17/30* (2006.01)

(52) U.S. Cl.
CPC ...... *G06F 17/30424* (2013.01); *G06F 17/3053* (2013.01); *G06F 17/30864* (2013.01); *G06F 17/30675* (2013.01); *G06F 17/30873* (2013.01)
USPC .......... 707/715; 707/723; 707/777; 707/748; 707/749; 707/798

(58) Field of Classification Search
CPC .......... G06F 17/30424; G06F 17/3053; G06F 17/30675; G06F 17/30874; G06F 17/30873
USPC .................. 707/715, 723, 777, 748, 749, 798
See application file for complete search history.

(56) References Cited

U.S. PATENT DOCUMENTS

| | | | |
|---|---|---|---|
| 8,005,643 B2 * | 8/2011 | Tunkelang et al. | 702/179 |
| 8,024,324 B2 * | 9/2011 | Amitay et al. | 707/715 |
| 8,024,327 B2 | 9/2011 | Tunkelang | |
| 8,380,714 B2 * | 2/2013 | Inagaki | 707/736 |
| 2009/0327271 A1 * | 12/2009 | Amitay et al. | 707/5 |
| 2010/0077001 A1 * | 3/2010 | Vogel et al. | 707/777 |
| 2010/0274815 A1 * | 10/2010 | Vanasco | 707/798 |
| 2011/0060644 A1 * | 3/2011 | Sweeney | 705/14.42 |
| 2011/0060645 A1 * | 3/2011 | Sweeney | 705/14.43 |
| 2011/0060794 A1 * | 3/2011 | Sweeney | 709/204 |
| 2011/0137921 A1 * | 6/2011 | Inagaki | 707/749 |

(Continued)

OTHER PUBLICATIONS

Jeffrey Pound et al: "Facet discovery for structured web search", Proceeding SIGMOD '11 Proceedings of the 2011 International Conference on Management of Data, ACM, New York, NY, USA, Jun. 12, 2011, pp. 169-180, XP058003130.

(Continued)

*Primary Examiner* — Frantz Coby
(74) *Attorney, Agent, or Firm* — David R. Stevens; Stevens Law Group (57) ABSTRACT

Systems and methods are disclosed herein for providing search results, particularly product records from a product database. Products records have facet groups associated therewith and facet groups have probabilities associated therewith indicating the usefulness of the facet group as a way of organizing or filtering search results. For a query, relevant product records are identified. For facet groups present among the relevant product records entropy values are calculated based on a distribution of values for the attribute defining the facet group. The entropy value increases as the distribution of values becomes more uniform. The facet group probability and entropy value are combined to assign a score to the facet groups. The facet groups are ranked and selected according to the score and search results are presented with indicators of the facet groups to enable a user to manage the search results.

20 Claims, 5 Drawing Sheets

(56) References Cited

U.S. PATENT DOCUMENTS

2012/0011129 A1* 1/2012 Van Zwol et al. ............ 707/748
2012/0226681 A1    9/2012 Paparizos
2012/0254162 A1* 10/2012 Asadullah et al. ............ 707/723
2012/0330977 A1* 12/2012 Inagaki ........................ 707/749
2013/0259379 A1* 10/2013 Slaney et al. ................. 382/190

OTHER PUBLICATIONS

Jiashen Sun et al: "Annotation-aware web clustering based on topic model and random walks", Cloud Computing and Intelligence Systems (CCIS), 2011 IEEE International Conference on, IEEE, Sep. 15, 2011, pp. 12-16, XP031976108.

* cited by examiner

Search Results 500a

| Product 502 | FG 504 |
| Product 502 | FG 504 |
| Product 502 | FG 504 |
| Product 502 | FG 504 |

Fig. 5A

Search Results 500b

| FG 504 | FG 504 | FG 504 |

| Product 502 |
| Product 502 |
| Product 502 |
| Product 502 |
| Product 502 |

FACET GROUP RANKING FOR SEARCH RESULTS

BACKGROUND

1. Field of the Invention

This invention relates to systems and methods for responding to search queries, and, more particularly, to searches for products in a product database.

2. Background of the Invention

It is the goal of many online retailers to be a one-stop-shop for customers. Accordingly, the retailer may have a very large array of products. In order to better meet the needs of customers, many retailers also integrate products of other merchants into their websites, further increasing the number of products available. With so many products offered for sale, it can be difficult for a customer to find a desired product through a search. Many retailers offer free-form text searches of their product databases. However, the large number of products available provides many opportunities for matching but irrelevant products.

Accordingly, it would be an advancement in the art to provide an improved approach to performing product-based searches that increases the relevance of search results to a user.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more transitory or non-transitory computer-usable or computer-readable media may be utilized. For example, computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
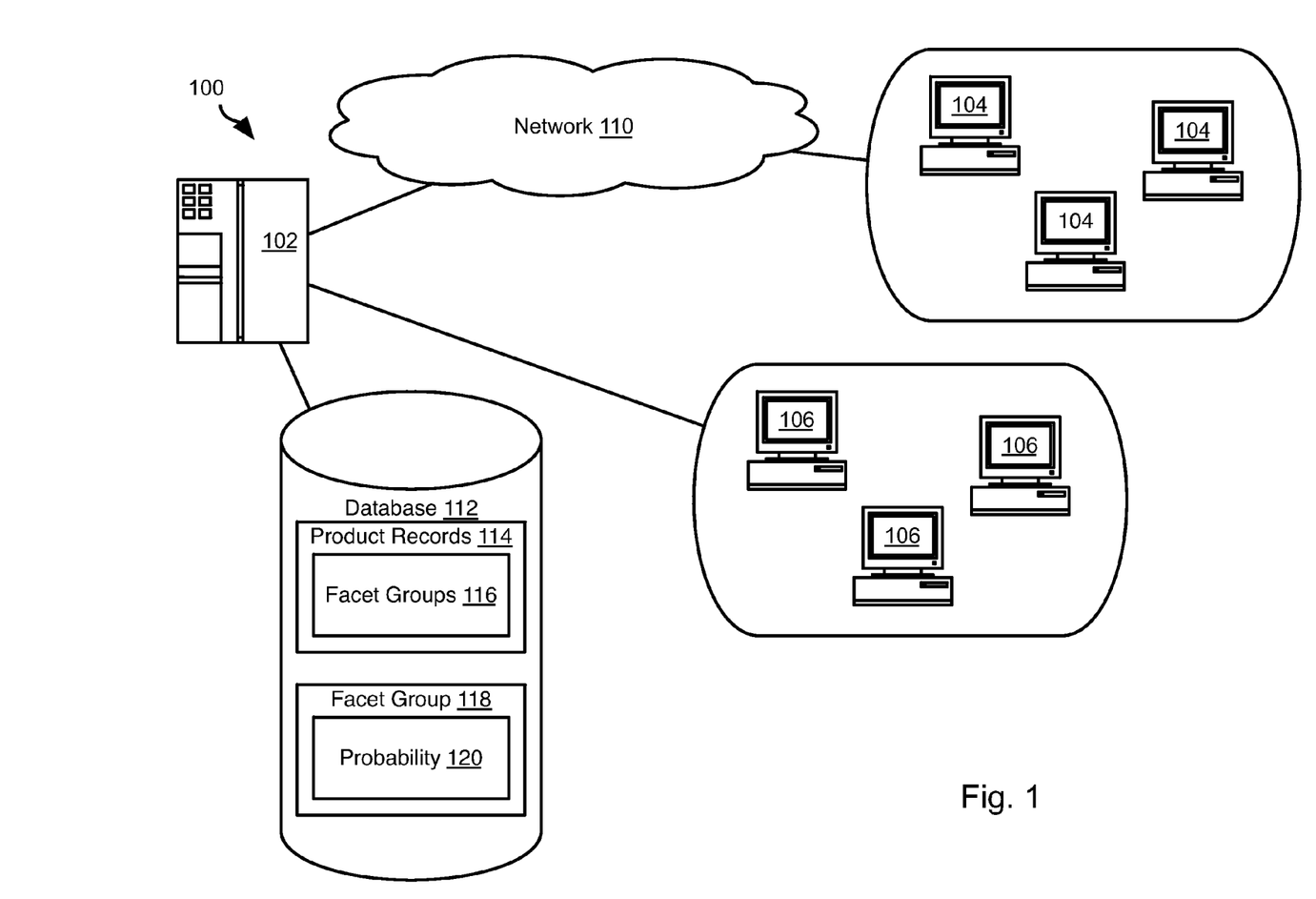
FIG. 1 is a schematic block diagram of a system for performing methods in accordance with embodiments of the present invention.

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more merchant workstations 104 and one or more customer workstations 106. In the methods disclosed herein, the merchant workstations 104 and customer workstations 106 may be embodied as mobile devices such as desktop computers or other computing device such as a mobile phone or tablet computer.

In some embodiments, some or all of the methods disclosed herein may be performed using a desktop computer or any other computing device as the merchant workstations 104 and customer workstations 106. For purposes of this disclosure, discussion of communication with a user or entity or activity performed by the user or entity (e.g. customer or merchant) may be interpreted as communication with a computer 104, 106 associated with the user or entity or activity taking place on a computer associated with the user or entity. The merchant workstations 104 may be viewed as a merchant computer network 104 whereby tasks to be performed by a merchant representative may be performed by any member of the population by means of logic implemented by the computer network, the server system 102, or some other entity.

Some or all of the server 102, merchant computers 104, and customer workstations 106 may communicate with one another by means of a network 110. The network 110 may be embodied as a peer-to-peer connection between devices, a connection through a local area network (LAN), WiFi network, the Internet, or any other communication medium or system. Each of the populations 104, 106 of workstations may be coupled to one another by separate networks some or all of the three populations 104, 106 of workstations may share a common network. For example, in the illustrated embodiments, the merchant workstations and server system 102 may communicate over a separate private network, rather than over the network 110.

The server system 102 may be associated with a merchant, or other entity, providing search services. For example, the server system 102 may host a search engine or a site hosted by a merchant to provide access to information about products and user opinions about products. For example, the server system may host or access a product database 112 storing a plurality of product records 114. The product records 114 may have one or more facet groups 116 associated therewith. For purpose of this disclosure a facet group is any attribute of a product record for a product offered for sale, which may include any attribute associated with a product including an attribute of a product itself, intended audience for a product (e.g. age group, gender, area of interest), in-store availability, availability for in-store, pickup, delivery options, payment options, category or subcategory to which a product belongs in a taxonomy, price range, brand, or the like. The product records 114 may be leaf nodes of a taxonomy including nodes representing product categories and subcategories. Accordingly, the categories for a product record 114 may be associated with the product due to its position in the taxonomy or due to a path describing categories and subcategories to which the product belongs stored as part of the product record 114.

In some embodiments, facet group records 118 may store data about individual facet groups or categories of facet groups. In particular, a facet group 118 may have one or more probabilities 120 associated therewith. In general, a probability 120 represents a likelihood that a facet group will be relevant to a user submitting a query. In other words, the likelihood that grouping search results according to the facet group will be helpful to a user. The probabilities 120 may be generated according to one or both of human judgment and observations of user responses. The probabilities 120 may also be generated automatically based on user interaction with search results marked or otherwise organized or accessed according to facet groups to which the search results belong.

Figure 2:
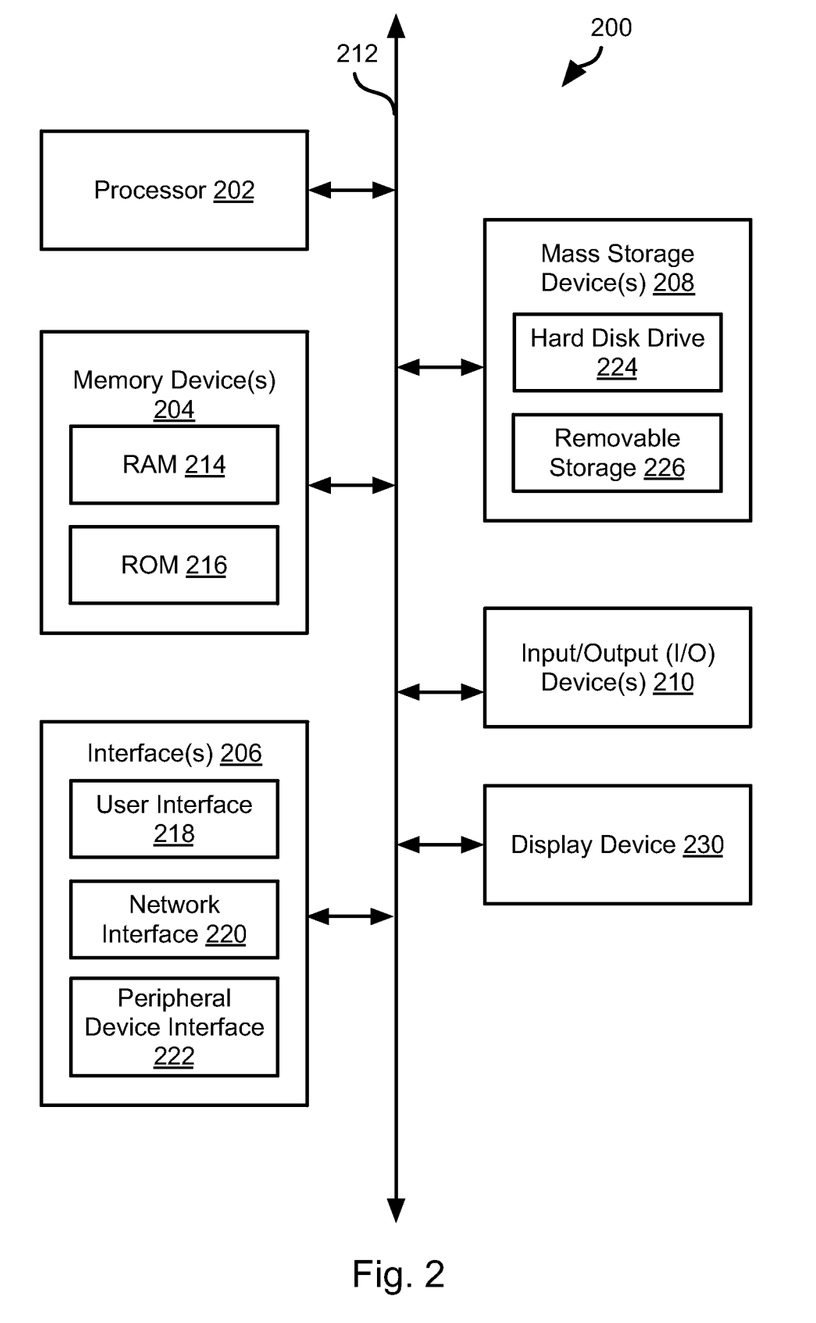
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, merchant workstation 104, and customer workstation 106, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more non-transitory mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
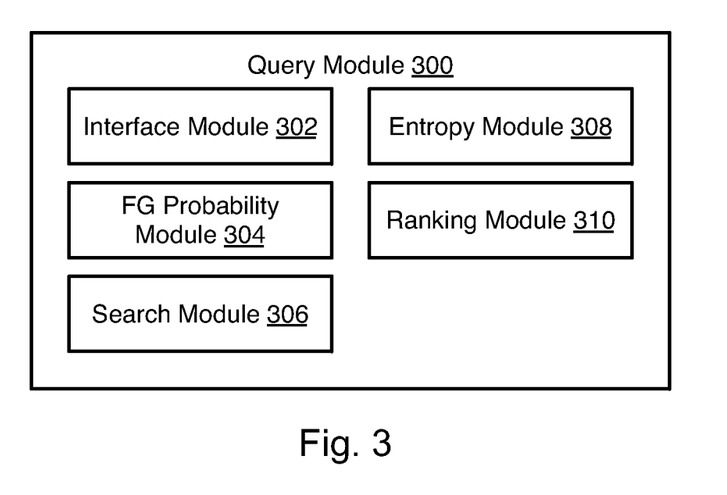
FIG. 3 is a schematic block diagram of modules implementing methods in accordance with embodiments of the present invention.

FIG. 3 illustrates a query module 300 including software and/or hardware modules implementing search methods disclosed herein. In some embodiments, the modules and data of the query module 300 are implemented or accessed by the server system 102 or some other entity that provides an interface to the server system 102.

The query module 300 may include an interface module 302 for receiving queries and transmitting responses to queries to a requesting entity. The query module 300 may be part of a data flow such that a query input to the query module 300 is not received directly from, for example, the customer workstation 106. For example, a query may be expanded or otherwise modified to include keywords associated with concepts identified in the query. The query may also be generated by some other software module executed by the server system 102. Whichever entity originated a query received by the interface module 302, the interface module 302 may route the search results to this requesting entity or to some other entity specified with the query.

The query module 300 may include a facet group probability module 304. The facet group probability module 304 may be operable to automatically determine the probability associated with a facet group based on observations of user behavior with respect to search results belonging to the facet group. As noted above, a facet group probability may be an indicator of the likelihood that a facet group is relevant to a user or is useful to a user as a way of organizing or accessing search results.

Methods described herein may be used to rank or otherwise sort or organize search results for a query. Accordingly, a search module 306 may search a corpus of documents, such as a database of product records, websites accessible over the Internet, or other corpus and return results relevant to a particular query. In the following disclosure methods are described as being performed with respect to product records, however other documents and collections of documents may also be the subject of the methods described herein. The search module 306 may implement any search algorithm, e.g. search engine, known in the art for identifying documents relevant to a query, from a simple keyword matching search to a more complex search with word sense disambiguation, contextual searching, or other strategy for identifying relevant documents.

The query module 300 may include an entropy module 308 that scales or otherwise modifies facet group probabilities in order to determine the relevance of a particular facet group to search results of a particular query, or a particular query to a particular user. The methods performed by the entropy module 308 are described in greater detail below. A ranking module 310 ranks one or both of facet groups and product records according to facet groups to which they belong using the facet group probabilities as adjusted according to the entropy module 308.

Figure 4:
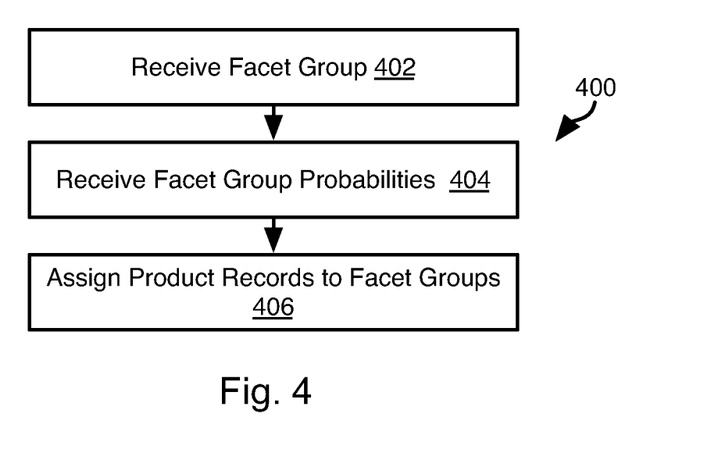
FIG. 4 is a process flow diagram of a method for defining facet groups in accordance with an embodiment of the present invention.

Referring to FIG. 4, as noted above each product may be assigned to a facet group. The facet groups that are considered according to methods disclosed herein may be specified according to human judgment and may include less than all possible attributes of a product record. Accordingly, the method 400 may include receiving 402 specification of a number of facet groups, such as from an analyst by means of a merchant workstation 104. A facet group may be specified as a single facet group, e.g. a single attribute, or as a class or category of attributes specified according to a rule. For example, where product records are organized into a taxonomy, a facet group may be specified to be a level of the taxonomy relative to the leaf node of a taxonomy to which a product record belongs, or relative to a root node of the taxonomy. As an example, the subcategory immediately above a product record, or N levels above a product record, may be specified as a facet group. Likewise, a category N levels below a root node may be specified as a facet group for descendent nodes thereof.

The method 400 may further include receiving 404 facet group probabilities for the received 402 facet groups. As for the facet groups themselves, a facet group probability may be assigned to a particular facet group or to a class of facet groups, such as a class of facet groups specified according to any of the approaches described with respect to step 402. The probabilities may be received from any source, such as from an operator of a merchant workstation 104 or some other entity or software module. The probabilities may be automatically calculated based on observations of user behavior.

The method 400 may further include assigning product records 406 to product records. As noted above, a facet group may be specified in term of an attribute or other aspect of a product record. Accordingly, those product records having an attribute or other aspect corresponding to a facet group may be deemed to belong to that facet group. In some embodiments, products or categories of products may be expressly excluded from inclusion in a facet group notwithstanding the product or category of products having the attribute or other aspect of the facet group. Accordingly, assigning 406 product records to facet groups may include refraining from assigning such products to such facet groups. In a like manner, a product record or category of product records may be assigned to a facet group notwithstanding a lack of an attribute or other aspect defining a facet group.

Figure 5A:
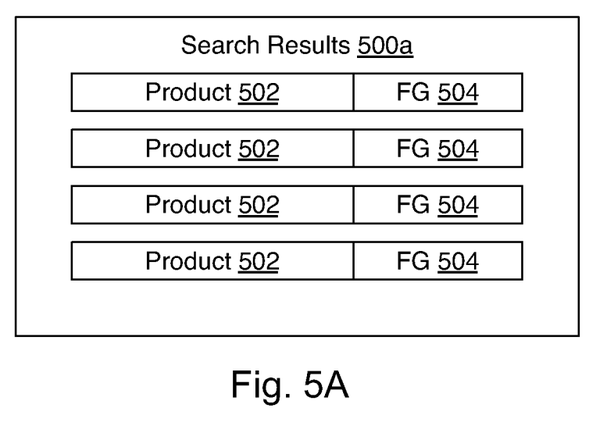
FIGS. 5A and 5B are schematic illustrations of interfaces for presenting search results including facet groups in accordance with an embodiment of the present invention.
Figure 5B:
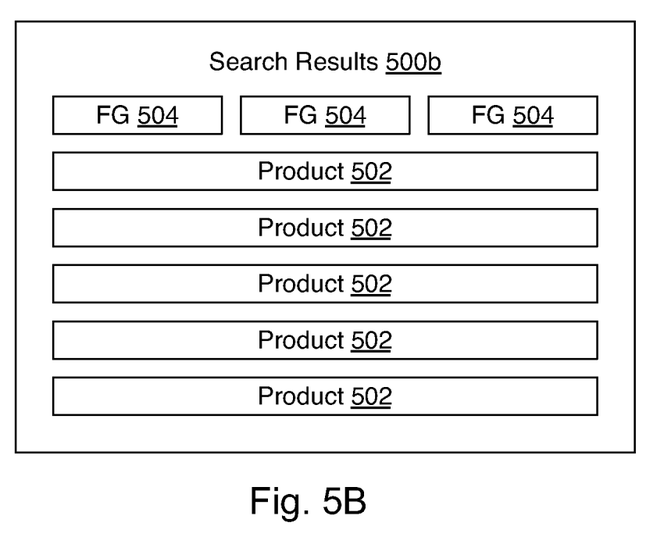

Referring to FIGS. 5A and 5B illustrate example interfaces 500a, 500b that may be used to present search results. The interfaces 500a, 500b may be presented on a customer computing device 106, such as by means of a browser executing on a customer computing device 106. Code defining the formatting and/or functionality of the interface 500a may be generated or retrieved by the server system 102 and transmitted to a customer workstation 106 in response to a query received from the customer workstation 106.

The interfaces 500a, 500b may include product elements 502 that present some or all of the information associated with a product record and that can be selected by a user to invoke display of additional information for a product record and/or invoke display of an interface for purchasing a product corresponding to a product record.

As shown in FIG. 5A, in one example, product elements 502 are each displayed adjacent a corresponding one or more facet group indicators 504. In the interface 500a, the facet group indicator 504 may indicate one or more facet groups assigned to the product record corresponding to the product element 502 adjacent the facet group indicator 504. The facet group indicator 504 may also be selectable by a user to invoke display of only those product records belonging to the facet group of the indicator 504. As is apparent in FIG. 5B, the interface 500b may include facet group indicators 504 that are not displayed in association with any particular product element 502. However, the facet group indicators 504 may likewise be used to invoke filtering of the product records and display of only those product indicators 502 for product records belonging to a selected facet group indicators.

The step of filtering the product records in response to selection of a facet group indicator 504 may be performed on a customer workstation 106, such as using code embedded in a document describing the interfaces 500a, 500b. Alternatively, selection of a facet group indicator 504 may invoke transmission of a request from the customer workstation 106 to the server system 102 to return a refreshed web page or other interface data limited to the facet group of the selected facet group indicator 504. In some embodiments, the interfaces of FIGS. 5A and 5B may be combined to include both independently displayed facet group indicators 504 of interface 500b and product indicator 502 specific facet group indicators 504 of the interface 500a.

Figure 6:
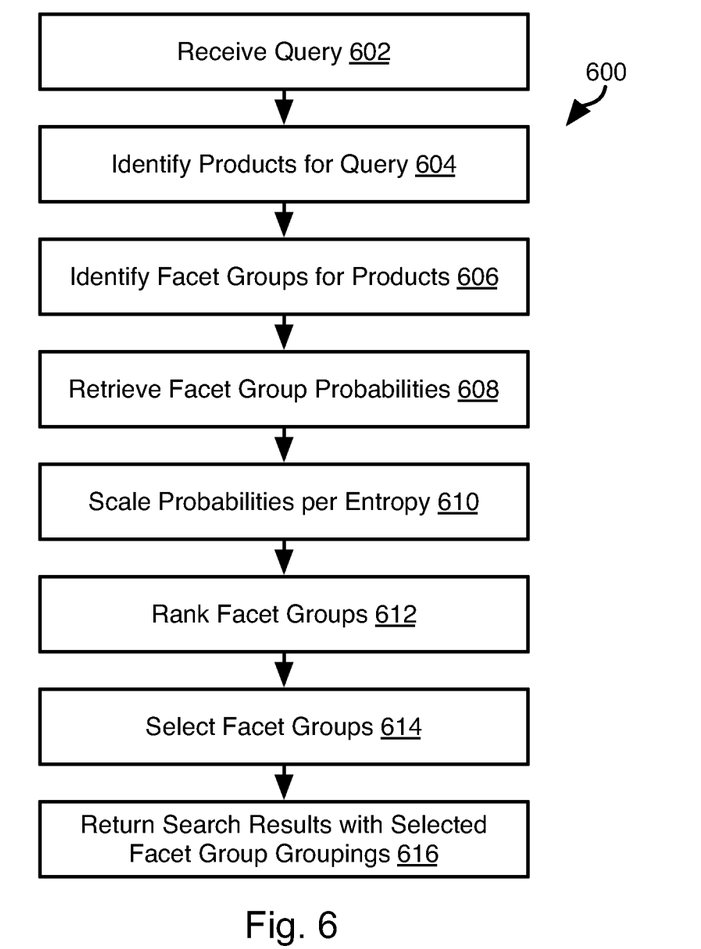
FIG. 6 is a process flow diagram of a method for ranking facet groups of search results in accordance with an embodiment of the present invention.

FIG. 6 illustrates a method 600 that may be used to rank facet groups associated with search results and otherwise use facet groups to enable a user to quickly find relevant product records. The method 600 may be executed by a server system 102 or by some other computer system with an interface provided to the server system 102.

The method 600 may include receiving 602 a query, such as a query from a customer workstation 106. A plurality of search results may then be identified 604 as relevant to the query, such as by performing a search of a product record database using the query. The algorithm by which search results are identified 604 may include any search algorithm known in the art.

A plurality of facet groups may then be identified 606 for the plurality of products. As noted above, each product may have one or more facet groups associated therewith according to the attributes or other aspects of the product record. Accordingly, identifying 606 facet groups for the identified 604 product records may include compiling a list of all unique facet groups for all retrieved 604 product records, or a portion thereof, such as the N highest ranked search results according to the search algorithm that identified 604 the product records.

For the identified 606 facet groups the facet group probability may be retrieved 608 for each facet group. In some embodiments a query-specific probability P(FG|q) may be calculated according to (1) that indicates the probability that a particular facet group (FG) is relevant to a query (q).

$$P(FG \mid q) = \frac{P(q \mid FG) P(FG)}{P(q)}, \qquad (1)$$

where P(FG) is a global probability that FG is relevant, P(q) is a static probability that a query q will be authored by a user. The value P(q|FG) represents the probability that given a particular facet group (FG) as a result, a query q has been issued by a user. The value of P(FG) may be manually specified according to human judgment about the relevance of a particular facet group, as described above. The value of P(q) is constant for each facet group and therefore can be ignored when ranking facet groups relative to one another. The value of P(q|FG) may be estimated by counting the query distribution associated with user clicks on particular facet groups (e.g. search results belonging to a particular facet group. In many applications, a workable approximation of (1) is P(FG|q)≈P(FG). As noted above, the probabilities for each facet group FG may be specified ahead of time and therefore retrieved 608 from a database of such values without the need for further calculation.

The method 600 may further include scaling 610 the facet group probabilities according to an entropy value. The entropy value reflects the makeup of the identified 604 product records belonging to each facet group. In particular, the entropy value for a facet group may increase with the evenness of the distribution of values corresponding to the attribute defining the facet group. In other words, the entropy for a facet group increases as the numbers of product records having each value for the defining attribute approach equality. Those attributes for which nearly all of the identified 604 product records have the same value do not help a consumer distinguish among products. Accordingly, such attributes will be discounted using the entropy scaling 610.

For example, scaling 610 the facet group probabilities may include calculating Score(FG) according to (2) or (3), where P(FG) is the facet group probability for a facet group FG.

$$\text{Score(FG)} = P(FG) \text{Entropy}(FG) \qquad (2)$$

$$\text{Score(FG)} = w_1 P(FG) + w_2 \text{Entropy}(FG) \qquad (3)$$

(2)

For (3), the values of $w_1$ and $w_2$ are weighting values determined according to logistic regression using training data. Training data may include entries including as inputs such information as a query, search results for the query, facet groups for the search results, probabilities for the facet groups and as outputs a relevance for the facet groups according to human judgment.

Entropy(FG) may be calculated according to (4), $$\text{Entropy}(FG) = -\sum_{i=1}^{k} P_i \ln(P_i) = -\sum_{i=1}^{k} \frac{N_i}{N} \ln\left(\frac{N_i}{N}\right), \quad (4)$$

where Pi is the probability that a product belonging to facet group FG will have value i corresponding to the attribute defining the facet group FG, k is the number of different values for the attribute defining the facet group, $N_i$ is the number of product records in the search results having the ith value for the attribute defining FG, and N is the total number of product records belonging to facet group FG. The value of k may be the number of all possible values for FG or the number of unique values present among the identified 604 product records belonging to FG.

As an example, some facet groups FG may correspond to binary attributes that can only have two possible values, e.g. a product is eligible for free shipping or it isn't. Accordingly, for such attributes, k=2, $N_1$ is the number of identified 604 products that are eligible for free shipping and $N_2$ is the number that are not eligible. In another example, a merchant may receive customer ratings for products such that each product has a rating associated therewith that may have up to k values, e.g. 4 stars, 3 stars, etc. Accordingly, $N_4$ is the number of identified 604 product records with fours stars, $N_3$ is the number with three stars, etc. For facet groups FG with textual values (including any combination of letters, digits, or other symbols) for the defining attribute of the FG, the value k is the number of unique values for the FG attribute found in the identified 604 records, and $N_1$ is the number of product records with the ith value for the attribute.

The value of (3) increases as the values of $N_1 \ldots N_k$ approach equality to one another. Other functions of $N_i$ and $N$ may also have this property, but with a different saturation value as $N_1 \ldots N_k$ approach equality and a different rate of approach to this value. For example the function $N_i/N$ has this property as well as $(N_i/N)\ln(N_1/N)$.

Using the scaled probabilities, the identified 606 facet groups may be ranked 612. Those with the highest scaled probabilities may be deemed to be more relevant to a user. In some embodiments, facet groups may be selected 614 according to the scores. For example, the top N facet groups with the highest scaled probabilities may be selected 614.

Some or all of the search results may then be returned 616 to the requesting entity. The search results may be returned along with the selected 614 facet groups. As noted with respect to FIGS. 5A and 5B, the returned facet groups may be transmitted as part of an interface that allows a user to filter or otherwise group the search results according to facet groups to which individual search results belong. The facet groups may be transmitted in a way that indicates the ranking of the facet group and or a value indicating the ranking thereof. In this manner, the user is given options to limit search results and the potential groupings have a high probability of being useful to the user in identifying products relevant to a query.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for searching, the method comprising:
   receiving, by a computer system, a query;
   identifying, by the computer system, a plurality of documents relevant to the query, each document of the plurality of documents having at least one facet group associated therewith such that a plurality of facet groups are associated with the plurality of documents;
   retrieving, by the computer system, global probabilities for the plurality of facet groups associated with the plurality of documents;
   combining, by the computer system, the retrieved global probabilities associated with the plurality of facet groups with a corresponding plurality of entropy values for the plurality of facet groups, each entropy value of the plurality of entropy values based on a distribution of values in the plurality of documents the facet group of the plurality of facet groups corresponding to the each entropy value;
   ranking, by the computer system, the plurality of facet groups according to the combining of the retrieved global probabilities and the corresponding entropy values;
   selecting, by the computer system, a portion of the plurality of facet groups according to the ranking; and
   returning, by the computer system, the plurality of documents and the portion of the facet groups.

2. The method of claim 1, wherein a corresponding entropy values for a facet group of the plurality facet groups are each calculated according to $$-\sum_{i=1}^{k} \frac{N_i}{N} \ln\left(\frac{N_i}{N}\right),$$

where i indicates a value corresponding to the facet group, $N_i$ is a number of documents in the plurality of documents including the value, and N is a total number of the plurality of documents belonging to the facet group.

3. The method of claim 1, wherein combining, by the computer system, the retrieved global probabilities associated with the plurality of facet groups with the plurality of corresponding entropy values for the plurality of facet groups based on the makeup of the plurality of facet groups further comprises:
   multiplying each global probability associated with a facet group of the plurality of facet groups by the entropy value corresponding thereto.

4. The method of claim 1, wherein combining, by the computer system, the retrieved global probabilities associated with the plurality of facet groups with the plurality of corresponding entropy values for the plurality of facet groups based on the makeup of the plurality of facet groups further comprises:
   weighting, using weighting values, both of each global probability associated with a facet group of the plurality of facet groups and the entropy value of the plurality of corresponding entropy values corresponding thereto; and
   summing the weighted each global probability and the entropy value corresponding thereto.

5. The method of claim 4, wherein the weighting values are determined according to logistic regression using training data.

6. The method of claim 1, wherein returning, by the computer system, the plurality of documents and the portion of the facet groups further comprises:
   returning, by the computer system, an interface with interface elements for invoking filtering of the plurality of documents by any facet group of the portion of the plurality of facet groups.

7. The method of claim 1, wherein each global probability of the global probabilities for the plurality of facet groups indicates a likelihood that a corresponding facet group of the plurality of facet groups is of interest to a user.

8. The method of claim 1, wherein the plurality of documents are a plurality of product records.

9. The method of claim 8, wherein the plurality of facet groups include one or more of brand, price, customer rating, and retailer.

10. The method of claim 8, wherein the plurality of facet groups include one or more of color, size, and category.

11. A system for searching, the system comprising one or more processors and one or more memory devices operably coupled to the one or more processors, the one or more memory devices storing executable and operational data effective to cause the one or more processors to:
   receive a query;
   identify a plurality of documents relevant to the query, each document of the plurality of documents having at least one facet group associated therewith such that a plurality of facet groups are associated with the plurality of documents;
   retrieve global probabilities for the plurality of facet groups associated with the plurality of documents;
   combine the retrieved global probabilities associated with the plurality of facet groups with a corresponding plurality of entropy values for the plurality of facet groups, each entropy value of the plurality of entropy values based on a distribution of values in the plurality of documents the facet group of the plurality of facet groups corresponding to the each entropy value;
   rank the plurality of facet groups according to the combining of the retrieved global probabilities and the corresponding entropy values;
   select a portion of the plurality of facet groups according to the ranking; and
   return the plurality of documents and the portion of the facet groups.

12. The system of claim 11, wherein the executable and operational data are further effective to cause the one or more processors to calculate a corresponding entropy values for a facet group of the plurality facet groups according to $$-\sum_{i=1}^{k} \frac{N_i}{N} \ln\left(\frac{N_i}{N}\right),$$

where i indicates a value corresponding to the facet group, $N_i$ is a number of documents in the plurality of documents including the value, and N is a total number of the plurality of documents belonging to the facet group.

13. The system of claim 11, wherein the executable and operational data are further effective to cause the one or more processors to combine the retrieved global probabilities associated with the plurality of facet groups with the plurality of corresponding entropy values for the plurality of facet groups based on the makeup of the plurality of facet groups by:
   multiplying each global probability associated with a facet group of the plurality of facet groups by the entropy value corresponding thereto.

14. The system of claim 11, wherein the executable and operational data are further effective to cause the one or more processors to combine the retrieved global probabilities associated with the plurality of facet groups with the plurality of corresponding entropy values for the plurality of facet groups based on the makeup of the plurality of facet groups by:
   weighting, using weighting values, both of each global probability associated with a facet group of the plurality of facet groups and the entropy value of the plurality of corresponding entropy values corresponding thereto; and
   summing the weighted each global probability and the entropy value corresponding thereto.

15. The system of claim 14, wherein the weighting values are determined according to logistic regression using training data.

16. The system of claim 1, wherein the executable and operational data are further effective to cause the one or more processors to return the plurality of documents and the portion of the facet groups by:
   returning an interface with interface elements for invoking filtering of the plurality of documents by any facet group of the portion of the plurality of facet groups.

17. The system of claim 11, wherein each global probability of the global probabilities for the plurality of facet groups indicates a likelihood that a corresponding facet group of the plurality of facet groups is of interest to a user.

18. The system of claim 11, wherein the plurality of documents are a plurality of product records.

19. The system of claim 18, wherein the plurality of facet groups include one or more of brand, price, customer rating, and retailer.

20. The system of claim 18, wherein the plurality of facet groups include one or more of color, size, and category.

* * * * *